US00RE46245E

(19) United States
(12) Reissued Patent
Vujea et al.

(10) Patent Number: US RE46,245 E
(45) Date of Reissued Patent: Dec. 27, 2016

(54) TRAY

(71) Applicant: Sargento Foods Inc., Plymouth, WI (US)

(72) Inventors: Matthew Vujea, Sheboygan Falls, WI (US); Kevin Heidemann, Sheboygan, WI (US); Brian Kaufman, Plymouth, WI (US)

(73) Assignee: Sargento Foods Inc., Plymouth, WI (US)

(21) Appl. No.: 29/513,957

(22) Filed: Jan. 7, 2015

Related U.S. Patent Documents

Reissue of:
(64) Patent No.: Des. 693,179
Issued: Nov. 12, 2013
Appl. No.: 29/420,469
Filed: May 9, 2012

(51) LOC (10) Cl. ..... 07-01

(52) U.S. Cl.
USPC ..... D7/555

(58) Field of Classification Search
USPC ..... D7/345, 360, 361, 500, 505, 543, 545, D7/552.1, 555, 558, 560, 561, 562, 565, D7/566, 586, 587, 601, 602; D9/341–348, D9/643, 744, 761; D1/122; D3/306; D6/403, 511, 513, 525, 537, 540, 556, D6/566, 567, 572, 574; D19/76; D28/61, D28/73; D30/130; 206/561; 211/13.1, 211/41.3, 41.4, 88.01, 85.4, 181.1; 215/382, 400; 220/23.4, 504, 574, 575, 220/751

(Continued)

(56) References Cited

U.S. PATENT DOCUMENTS

D9,661 S 12/1876 Heuacker
D38,779 S * 9/1907 Wilhelm et al. ..... D7/555

(Continued)

FOREIGN PATENT DOCUMENTS

| | | |
|---|---|---|
| CA | 148193 | 7/2013 |
| MX | 42030 | 7/2014 |
| MX | 42735 | 10/2014 |

OTHER PUBLICATIONS

Notice of Allowance from the United States Patent and Trademark Office for U.S. Appl. No. 29/455,359 dated May 22, 2015 (9 pages).

(Continued)

*Primary Examiner* — Darlington Ly
(74) *Attorney, Agent, or Firm* — Michael Best & Friedrich LLP

(57) CLAIM

We claim the ornamental design for a [round] tray, as shown and described.

DESCRIPTION

FIG. 1 is an isometric view of the claimed design from the top, right side, and front side thereof;
FIG. 2 is a top plan view thereof;
FIG. 3 is bottom plan view thereof;
FIG. 4 is front side view thereof;
FIG. 5 is a back side view thereof;
FIG. 6 is a left side view thereof;
FIG. 7 is a right side view thereof;
FIG. 8 is a first cross-sectional view thereof taken along line 8-8 in FIG. 2;
FIG. 9 is a second cross-sectional view design thereof taken along line 9-9 in FIG. 2;
FIG. 10 is a third cross-sectional view design thereof taken along line 10-10 in FIG. 2;
FIG. 11 is a fourth cross-sectional view design thereof taken along line 11-11 in FIG. 2; and,
FIG. 12 is a fifth cross-sectional view design thereof taken along line 12-12 in FIG. 2.
*The broken lines having equal length segments shown in the drawings illustrate portions of the tray that form no part of the claimed design. The broken lines having unequal length segments illustrate the boundary of the claimed design and form no part of the claimed design.*

1 Claim, 8 Drawing Sheets

Matter enclosed in heavy brackets [ ] appears in the original patent but forms no part of this reissue; matter printed in italics indicates the additions made by reissue.

(AMENDED)

(58) Field of Classification Search
CPC ..... A47G 19/02; A47G 19/022; A47G 19/03; B65D 81/3453
See application file for complete search history.

(56) References Cited

U.S. PATENT DOCUMENTS

| | | | | | |
|---|---|---|---|---|---|
| 1,945,013 | A | * | 1/1934 | Wilson | 220/574 |
| 1,945,397 | A | | 1/1934 | Gray | |
| D107,816 | S | | 1/1938 | Barnhart | |
| D155,299 | S | | 9/1949 | Laier | |
| D160,667 | S | | 10/1950 | Sengstack | |
| D176,824 | S | * | 1/1956 | Sacia | D7/555 |
| D185,067 | S | * | 5/1959 | Clark | D7/546 |
| 3,014,616 | A | | 12/1961 | Kavanaugh et al. | |
| D219,748 | S | | 1/1971 | Bixler | |
| D249,108 | S | | 8/1978 | Cannon, Jr. | |
| D249,916 | S | | 10/1978 | Collins | |
| D264,924 | S | | 6/1982 | Swett | |
| D278,128 | S | | 3/1985 | VanDine et al. | |
| 5,172,826 | A | * | 12/1992 | Celaya | 220/574 |
| D366,737 | S | | 1/1996 | Chen | |
| D401,116 | S | | 11/1998 | Demore | |
| 5,853,105 | A | | 12/1998 | Roman et al. | |
| D417,149 | S | | 11/1999 | Fletcher et al. | |
| D418,020 | S | | 12/1999 | Tardif | |
| D440,490 | S | | 4/2001 | Lizzio | |
| D448,977 | S | | 10/2001 | Bleimaier et al. | |
| D454,489 | S | | 3/2002 | Enciso et al. | |
| D466,407 | S | | 12/2002 | Nance | |
| D467,125 | S | * | 12/2002 | Orr et al. | D7/541 |
| D483,999 | S | | 12/2003 | Beachum et al. | |
| D484,000 | S | | 12/2003 | Levien | |
| D498,980 | S | * | 11/2004 | Smith et al. | D7/549 |
| D499,304 | S | * | 12/2004 | Wiedmeyer et al. | D7/549 |
| D508,379 | S | * | 8/2005 | Doliwa | D7/629 |
| D514,384 | S | | 2/2006 | Mitchell et al. | |
| D529,797 | S | | 10/2006 | Wilcox et al. | |
| D529,821 | S | | 10/2006 | Wilcox et al. | |
| D530,625 | S | * | 10/2006 | Darin | D9/761 |
| D562,683 | S | | 2/2008 | Sweeton et al. | |
| D569,193 | S | * | 5/2008 | El Ghouyel | D7/602 |
| D587,971 | S | * | 3/2009 | Peabody et al. | D7/555 |
| D591,175 | S | | 4/2009 | Larson | |
| D595,154 | S | | 6/2009 | Nicholson et al. | |
| D605,936 | S | | 12/2009 | Durdon et al. | |
| D610,407 | S | | 2/2010 | Rauckman | |
| D623,020 | S | | 9/2010 | De Bretton Gordon | |
| D623,021 | S | | 9/2010 | De Bretton Gordon | |
| D623,479 | S | | 9/2010 | De Bretton Gordon | |
| D625,960 | S | | 10/2010 | Lipfert et al. | |
| D629,654 | S | | 12/2010 | Moon | |
| D629,681 | S | * | 12/2010 | Ehrmann | D9/425 |
| D633,340 | S | * | 3/2011 | Roberts | D7/549 |
| D652,683 | S | * | 1/2012 | Munoz | D7/555 |
| D670,041 | S | | 10/2012 | Chance et al. | |
| 8,337,073 | B2 | * | 12/2012 | Roberts | 366/130 |
| D693,178 | S | * | 11/2013 | Wilson | D7/553.2 |
| D693,179 | S | * | 11/2013 | Vujea et al. | D7/555 |
| D693,180 | S | | 11/2013 | Peterson et al. | |
| D694,621 | S | | 12/2013 | McCarthy et al. | |
| D695,077 | S | | 12/2013 | Chase | |
| D700,509 | S | | 3/2014 | Shirley et al. | |
| D710,701 | S | | 8/2014 | Lai | |
| D715,595 | S | | 10/2014 | Gunstad et al. | |
| D718,092 | S | | 11/2014 | Lion et al. | |
| D731,248 | S | | 6/2015 | Breton | |
| D734,097 | S | | 7/2015 | Vue et al. | |
| D737,054 | S | | 8/2015 | Winston | |
| D737,633 | S | | 9/2015 | Breton | |
| 2010/0108686 | A1 | | 5/2010 | Reichel | |
| 2012/0097673 | A1 | | 4/2012 | McDonald et al. | |
| 2013/0015096 | A1 | | 1/2013 | BeVier et al. | |

OTHER PUBLICATIONS

Notice of Allowance from the United States Patent and Trademark Office for U.S. Appl. No. 29/508,948 dated Nov. 20, 2015 (9 pages).

* cited by examiner

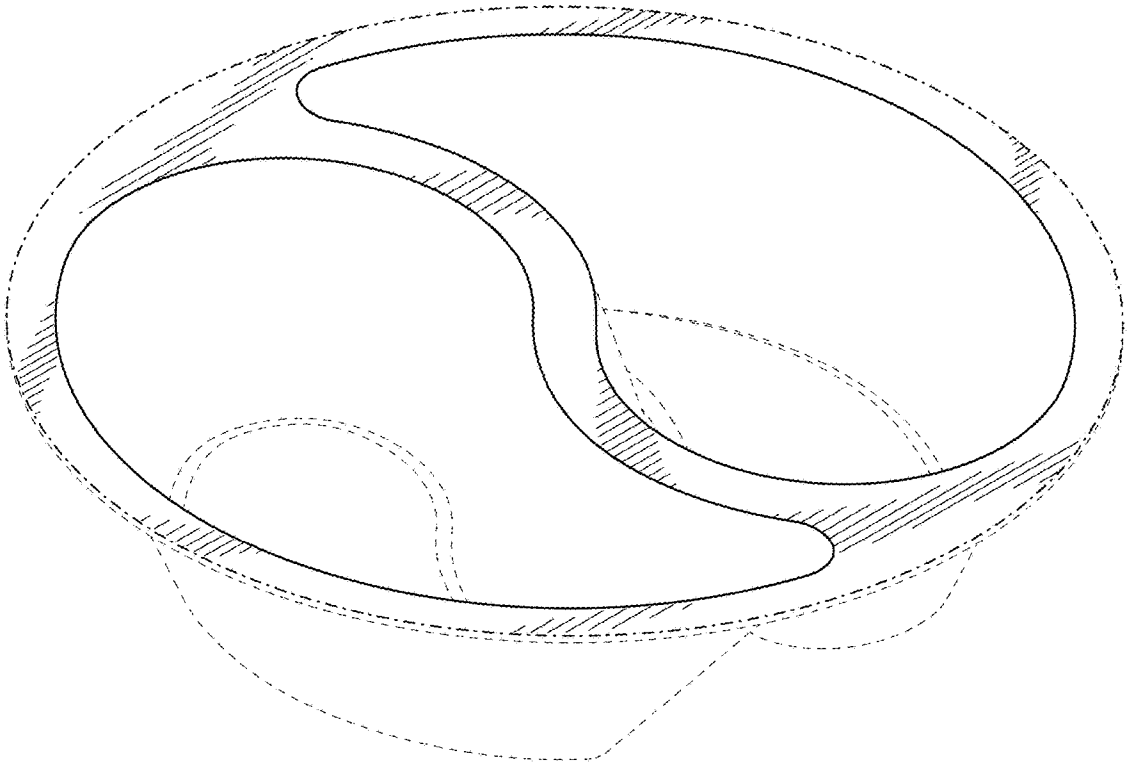
FIG. 1
(AMENDED)

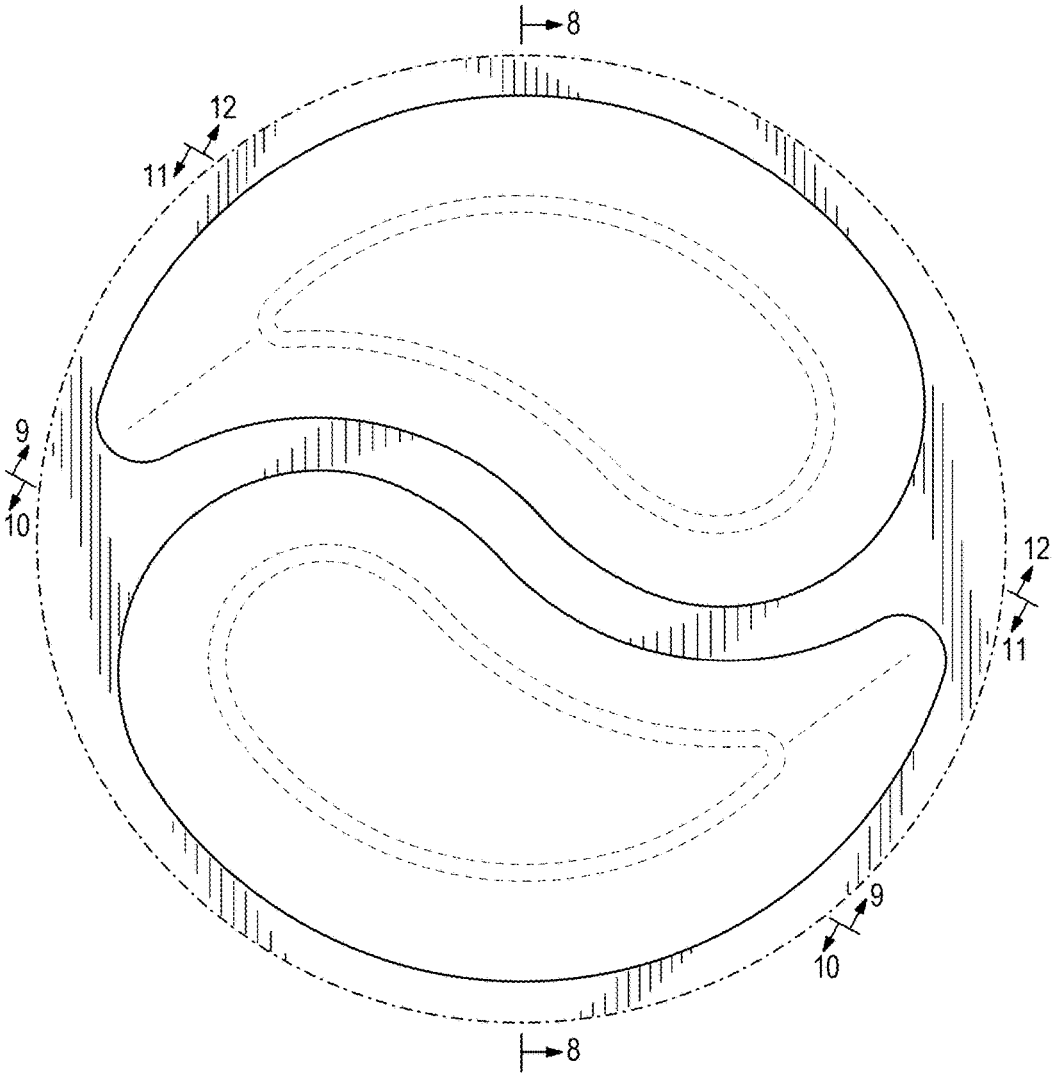
*FIG. 2*
(AMENDED)

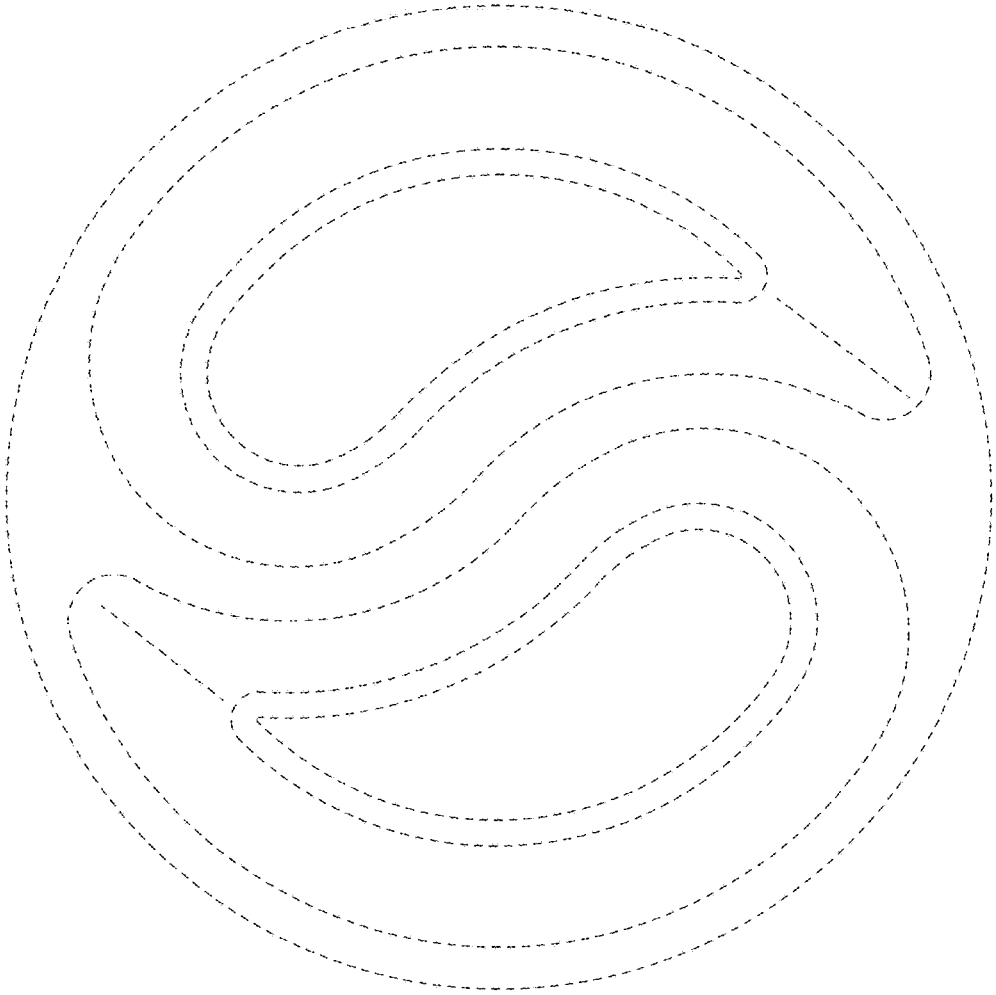
*FIG. 3*
(AMENDED)

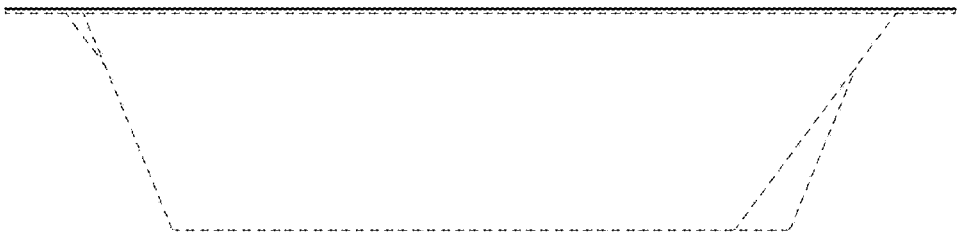
*FIG. 4*
(AMENDED)
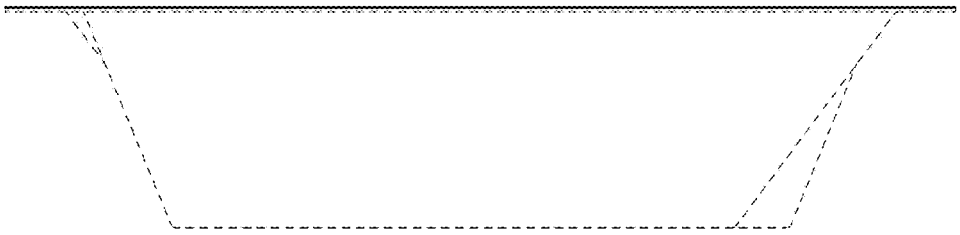
*FIG. 5*
(AMENDED)

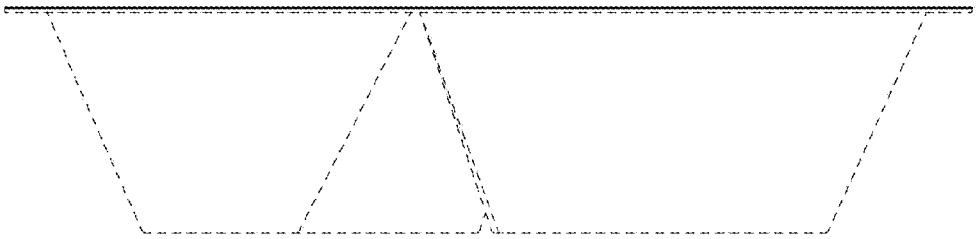
*FIG. 6*
(AMENDED)
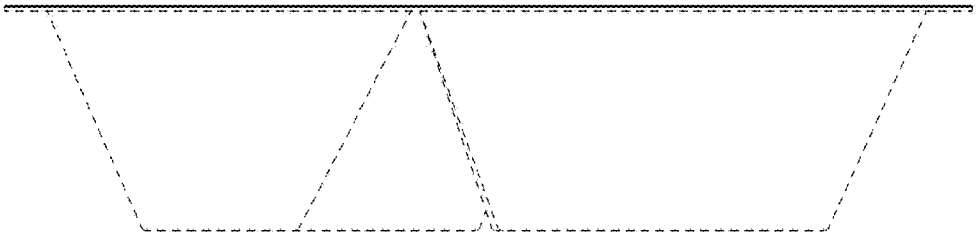
*FIG. 7*
(AMENDED)

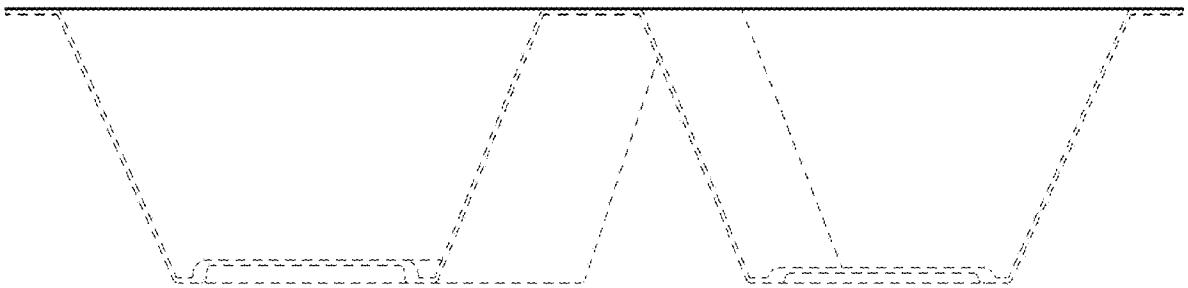
FIG. 8
(AMENDED)

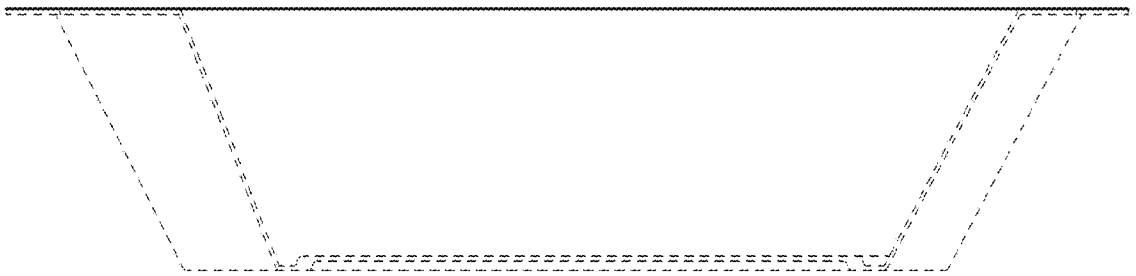
FIG. 9
(AMENDED)
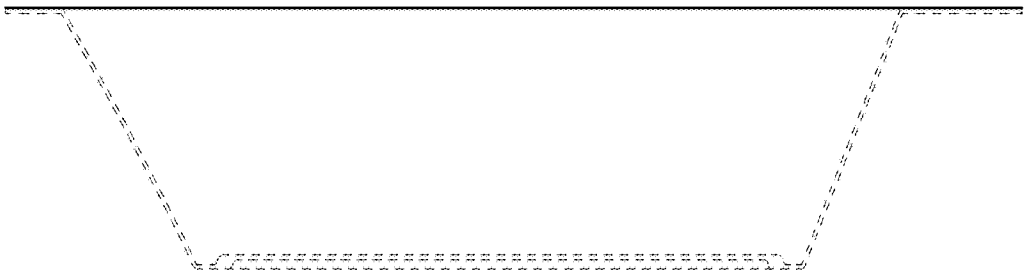
FIG. 10
(AMENDED)

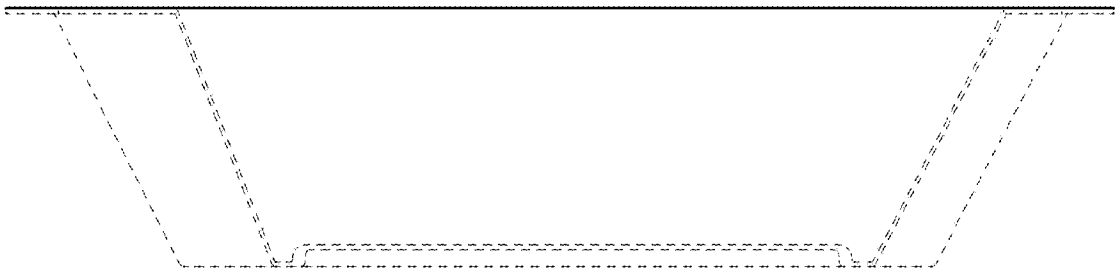
FIG. 11
(AMENDED)
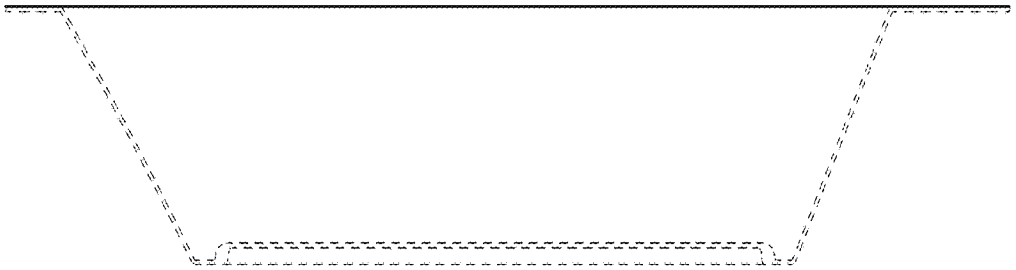
FIG. 12
(AMENDED)